US012101201B2

(12) United States Patent
Dixon et al.

(10) Patent No.: US 12,101,201 B2
(45) Date of Patent: Sep. 24, 2024

(54) COMMUNICATION, MONITORING AND CONTROL ARCHITECTURE AND METHOD

(71) Applicant: Comcast Interactive Media, LLC, Philadelphia, PA (US)

(72) Inventors: Christopher Dixon, Merion Station, PA (US); James Poder, Carlsbad, CA (US)

(73) Assignee: Comcast Interactive Media, LLC, Philadelphia, PA (US)

( * ) Notice: Subject to any disclaimer, the term of this patent is extended or adjusted under 35 U.S.C. 154(b) by 0 days.

(21) Appl. No.: 18/472,539

(22) Filed: Sep. 22, 2023

(65) Prior Publication Data

US 2024/0129159 A1 Apr. 18, 2024

Related U.S. Application Data

(63) Continuation of application No. 17/010,529, filed on Sep. 2, 2020, now Pat. No. 11,799,683, which is a (Continued)

(51) Int. Cl.
*H04L 12/28* (2006.01)
*H04L 61/00* (2022.01)
(Continued)

(52) U.S. Cl.
CPC ...... *H04L 12/2838* (2013.01); *H04L 12/2814* (2013.01); *H04L 61/35* (2013.01);
(Continued)

(58) Field of Classification Search
CPC . H04L 12/2838; H04L 12/2814; H04L 61/35; H04L 61/50; H04N 21/2393;
(Continued)

(56) References Cited

U.S. PATENT DOCUMENTS 7,620,914 B2   11/2009   Li et al.
8,060,604 B1   11/2011   Breau et al.
(Continued)

FOREIGN PATENT DOCUMENTS

WO   99/57839 A3   6/2000

OTHER PUBLICATIONS

European Search report—EP 11195203.2—Mailing Date: Sep. 17, 2012.
(Continued)

*Primary Examiner* — Oschta I Montoya
(74) *Attorney, Agent, or Firm* — Banner & Witcoff, Ltd.

(57) ABSTRACT

A communication network device facilitates communication between devices and/or applications in a network without requiring each device to register with every other device or application. The communication network device may generate and assign a unique identifier to each device or application upon registration and store a role of the device or application (e.g., sender or receiver or both) in addition to capability and compatibility information. The communication network device may then dynamically broker and manage communications from each of the devices or applications to other devices and applications in real-time. Using a communication network device, communications may be directed to devices or applications without requiring a sending device to know of the recipient's network address. Additionally, the communication network device allows for the direct targeting of communications to specific applications. Accordingly, in some arrangements, two applications running on the same device may receive different communications from another device or application.

30 Claims, 9 Drawing Sheets

Related U.S. Application Data continuation of application No. 12/979,555, filed on Dec. 28, 2010, now Pat. No. 10,797,904.

(51) Int. Cl.
| | |
|---|---|
| *H04L 61/50* | (2022.01) |
| *H04N 21/239* | (2011.01) |
| *H04N 21/41* | (2011.01) |
| *H04N 21/441* | (2011.01) |
| *H04N 21/472* | (2011.01) |
| *H04N 21/6587* | (2011.01) |

(52) U.S. Cl.
CPC ......... *H04L 61/50* (2022.05); *H04N 21/2393* (2013.01); *H04N 21/41265* (2020.08); *H04N 21/441* (2013.01); *H04N 21/47217* (2013.01); *H04N 21/6587* (2013.01)

(58) Field of Classification Search
CPC ........... H04N 21/41265; H04N 21/441; H04N 21/47217; H04N 21/6587
See application file for complete search history.

(56) References Cited

U.S. PATENT DOCUMENTS

| | | | |
|---|---|---|---|
| 8,416,804 B2* | 4/2013 | Tischer | ........ H04L 12/66 370/254 |
| 8,554,187 B2 | 10/2013 | Tischer et al. | |
| 2003/0074672 A1 | 4/2003 | Daniels | |
| 2003/0172173 A1 | 9/2003 | Fenton | |
| 2003/0236892 A1* | 12/2003 | Coulombe | ........ H04L 67/303 709/228 |
| 2004/0019696 A1 | 1/2004 | Scott et al. | |
| 2004/0135819 A1 | 7/2004 | Maa | |
| 2004/0249924 A1 | 12/2004 | Watanabe et al. | |
| 2007/0079010 A1 | 4/2007 | Heredia et al. | |
| 2008/0317004 A1 | 12/2008 | Cai et al. | |
| 2009/0232020 A1* | 9/2009 | Baalbergen | ........ H04L 12/2809 370/254 |
| 2010/0313226 A1 | 12/2010 | Cholas et al. | |
| 2011/0055935 A1 | 3/2011 | Karaoguz et al. | |
| 2011/0185181 A1* | 7/2011 | Lin | ........ H04L 63/123 380/279 |
| 2011/0265151 A1 | 10/2011 | Furlan et al. | |
| 2012/0066767 A1* | 3/2012 | Vimpari | ........ G06Q 20/3821 726/26 |
| 2012/0162538 A1 | 6/2012 | Dixon et al. | |

OTHER PUBLICATIONS

Dec. 19, 2016—EP Office Action—App 11195203.2.
Nov. 2, 2017—Canadian Office Action—CA 2,762,695.
Oct. 9, 2018—Canadian Office Action—CA 2,762,695.
Dec. 6, 2018—European Decision to Refuse—EP 11195203.2.
Nov. 6, 2019—Canadian Office Action—CA 2,762,695.
Sep. 11, 2020, Canadian Office Action, CA 2,762,695.
Dec. 9, 2021—Canadian Office Action—CA 2,762,695.

* cited by examiner

REGISTRATION — 400

401 — LOGIN
- Username: userone
- Password: ***********

405

403 — DEVICE/APP IDENTIFICATION
- Type: 407
  - Device
  - Device
  - Application
- Application or Device: [ ] browse — 409
- Role: 413
  - Both
  - Sender
  - Receiver
  - Both

[clear]  [login & register]  [cancel]
415       411                  417

NEW DEVICE REGISTRATION — 450

451 — Assigned ID: 3849

453

| | 455 | 457 | 459 |
|---|---|---|---|
| Device A | S/R | Send/Receive | None |
| Application A | S/R | Send | Receiver |
| Application B | S/R | Send/Receive | None |
| Device B | S | Receive | None |
| Device C | R | None | Send/Receive |

[reset]  [done]

FIG. 4B

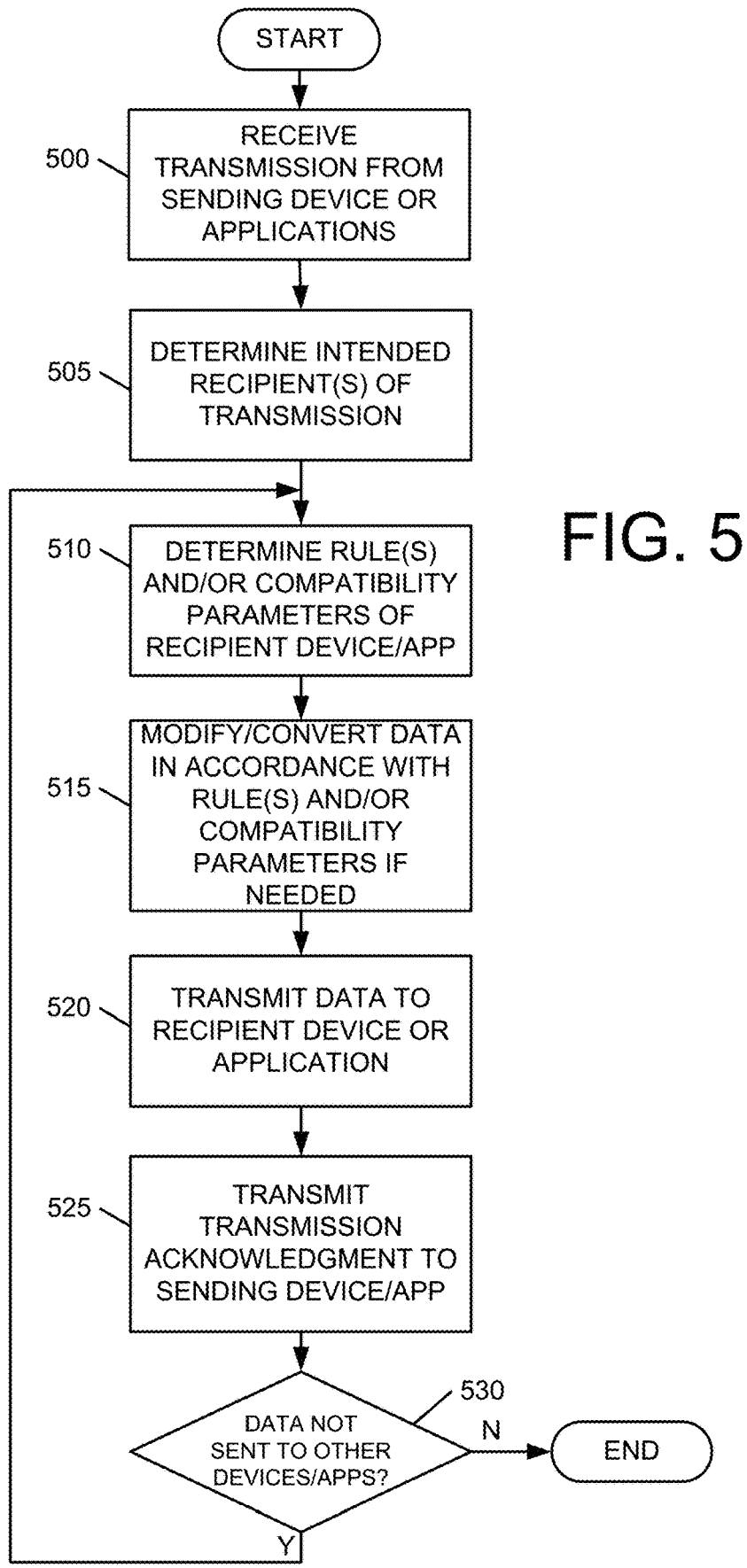

| Entity 1 | ROLE | Entity 2 |
|---|---|---|
| Application A | Sender/Receiver | Application B |
| Application B | Sender | ALL |
| Application C | Sender | Device A, Application B |
| Device B | Receiver | Application B |
| Application C | Receiver | Device C, Application D |

FIG. 8

COMMUNICATION, MONITORING AND CONTROL ARCHITECTURE AND METHOD

CROSS-REFERENCE TO RELATED APPLICATIONS

This application is a continuation of and claims priority to U.S. patent application Ser. No. 17/010,529 filed on Sep. 2, 2020, which is a continuation of U.S. patent application Ser. No. 12/979,555 filed on Dec. 28, 2010 (now U.S. Pat. No. 10,797,904), each of which is hereby incorporated by reference in its entirety.

TECHNICAL FIELD

Aspects of the disclosure relate to providing a communication and control interface for multiple devices. In particular, aspects relate to facilitating communications and control among a variety of devices.

BACKGROUND

Today, using one device to communicate with another often requires each device to know of the other device and to be able to communicate according to a specified protocol. In one example, a remote control may be used to operate the functionality of a television or other user devices. The user devices might have a certain number of understandable commands such as up, down, left, right, number entry, recording/playback buttons and the like. Some applications and devices, however, may include controls or functionalities that allow a user to perform commands other than the limited set of commands understood by the user devices.

Furthermore, communication between devices often requires a direct link between the devices. As such, one device may have to uniquely identify and register itself to another device and vice versa. Alternatively, no identification may be provided between devices, in which case the device might not be able to identify the source of any commands, controls, inputs, data and/or other signals. For example, a television might receive commands from any remote control so long as the correct frequency is used. However, the television would not know which remote control sent the command (if there were multiple remotes). Alternatively, if information identifying a device from which a command originated is to be provided to the television and other devices, the remote control may be required to previously register with the television. Such registration may become complex and time-consuming as registration would be needed between each pair of devices. Additionally, current device-to-device linkages might not allow a device to specifically target or register applications running on another device.

BRIEF SUMMARY

The following presents a simplified summary of the disclosure in order to provide a basic understanding of some aspects. It is not intended to identify key or critical elements of the disclosure or to delineate the scope thereof. The following summary merely presents some concepts of the disclosure in a simplified form as a prelude to the more detailed description provided below.

According to one or more aspects, a communication network device, such as a communication server, may be provided to facilitate dynamic and/or real-time communication between multiple devices and applications executing thereon. The server may be configured as a central registration entity that coordinates the receipt and delivery of commands, user input, data and other information and signals between devices, applications or both. For example, a remote control, a display device (e.g., monitor, television and the like), a personal computer, a content display control system may all be registered with the server to receive and/or send data to one or more of the other devices or applications. Accordingly, the remote control may be able to send commands to the personal computer, the television and/or the television control system by registering once with the server and specifying receiving and transmission parameters and permissions. In other arrangements or examples, multiple users may operate multiple device or applications to play a trivia game facilitated by a trivia server. Each instance of the trivia application may thus be treated as a different entity and data may be transmitted between the applications dynamically to provide real-time play.

According to another aspect, each device may be assigned an identifier specifically generated for the device such as an identification code or a username or user identifier of a user operating the device. This identifier may, in some instances, be re-used upon disconnection of a device corresponding to the identifier. Additionally, the code may be unique to the device (e.g., within a communication server's network of devices) while the device is registered and/or connected to the registration and communication server. In one or more arrangements, each identifier may correspond to a different socket or thread or session within a socket of the registration and communication server. Furthermore, communication from a device or application might not need to specify a destination application or device. Instead, a server may automatically associate identifiers and thus, know which other devices or applications to transmit the communication.

According to yet another aspect, individual applications running on devices connected to a registration server may each be uniquely identified by an identifier. The identifier may, for example, include an identification code specifically generated for the application or may correspond to a user identifier (e.g., a username and/or a password) of a user operating the application. Application identification codes or other forms of application identifiers may then be used to direct data, content and other information to specific applications rather than to an entire device. In one example, each application may be mapped to a different thread in session-based communications with the registration and communication server. In one arrangement, multiple communication sessions or threads may use the same socket of the registration and communication server. Alternatively or additionally, different threads may use different sockets. By identifying each application separately, different user experiences may be provided based on the applications being used by the various users. Additionally, a single device or multiple devices running multiple applications may receive different types of data or customized information for each of the multiple applications. In some examples, data may be formatted, compressed and/or otherwise modified by the server based on the type of application or device to which the data is to be delivered, capabilities of the application or a device and the like.

The details of these and other embodiments of the present disclosure are set forth in the accompanying drawings and the description below. Other features and advantages of the invention will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which:

FIGS. 4A and 4B illustrate example enrollment or registration interfaces according to one or more aspects described herein.

FIG. 5 illustrates an example method for processing communications according to one or more aspects described herein.

FIG. 8 illustrates an example enrollment configuration table according to one or more aspects described herein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present disclosure.

Figure 1:
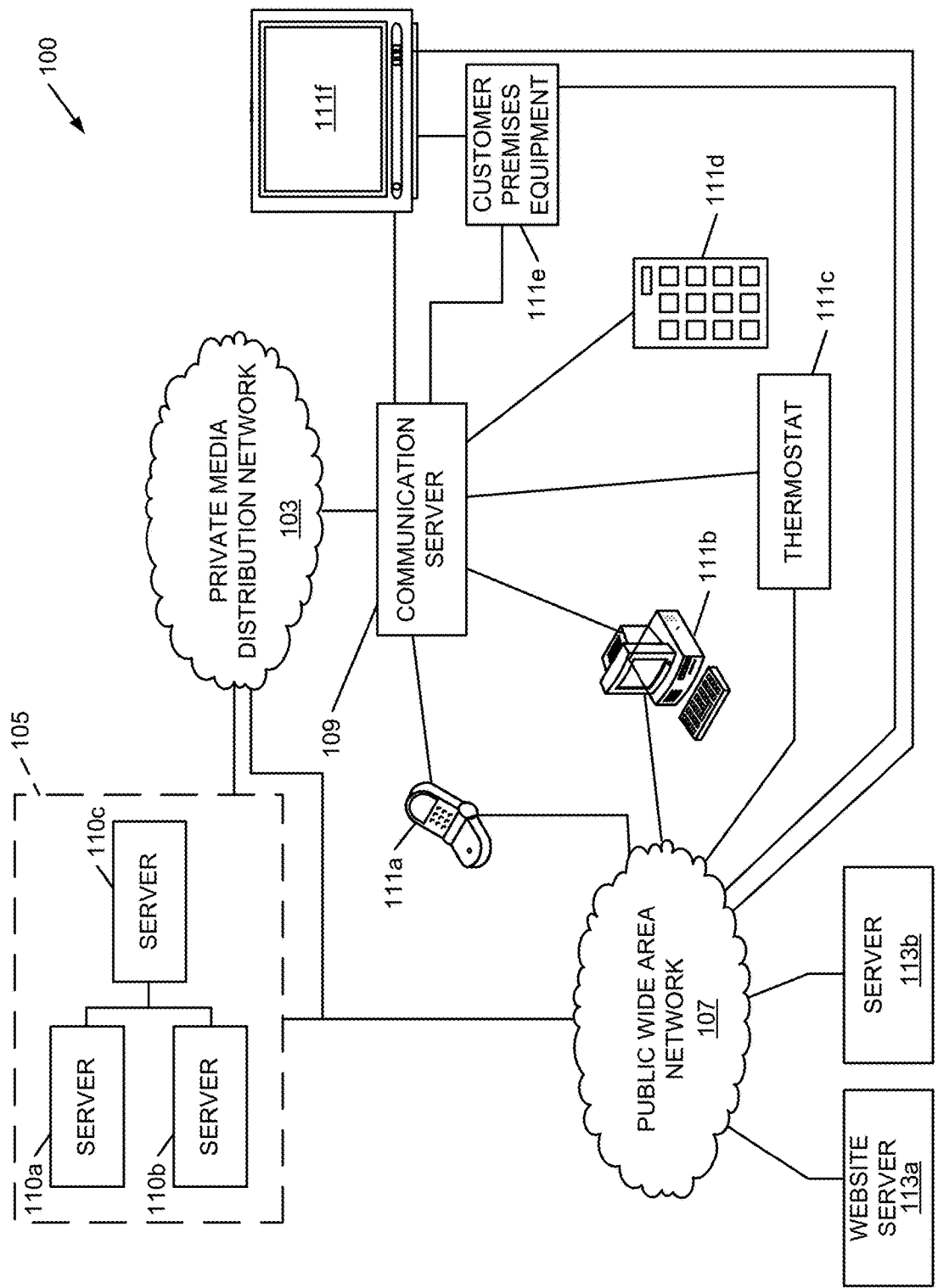
FIG. 1 illustrates an example network environment according to one or more aspects described herein.

FIG. 1 illustrates a network environment 100 that may be used in connection with one or more aspects described herein. The network environment 100 may include a private media distribution network 103 connecting a service provider network 105 with one or more client devices 111. Private media distribution network 103 may, in one or more arrangements, require a subscription to the services provided by service provider network 105 to access the content, services and other data offered therethrough. Private media distribution network 103 may, in one or more alternative or additional arrangements, enforce access restriction based on location, size, demographics, user information and the like. For example, a private media distribution network 103 may be defined as a network within an office building or home. In another example, private media distribution network 103 may be defined as a network including no more than 100 users. In yet another example, private media distribution network 103 may be defined based on boundaries of a physical network infrastructure or by users that pay or subscribe to a particular service. Combinations of factors may also be used. For example, private media distribution network 103 may be configured to include the first 100 users logged in from an office building or other specified location (e.g., a café). Alternatively, network 105 may be a free or public network that users may access without subscriptions or other types of payment.

According to one or more aspects, a service provider (e.g., of service provider network 105) may provide user (e.g., subscriber) devices such as client devices 111a, 111b and/or 111e, and provide such devices with access to a local or wide area network such as the Internet. Thus, client devices 111a, 111b and/or 111e, for example, may request information from servers and devices including website server 113a and content server 113b through media distribution network 103 and service provider network 105. Service provider network 105 may comprise a single distribution system or may include multiple systems having servers 110. In one example, private media distribution network 103 may comprise a wireless, coaxial, cable and/or fiber optic (or a hybrid combination thereof) network configured to facilitate communication of data, messages, content, commands and other information between client devices 111 and service provider network 105. For example, network 103 may comprise optical connections between a service provider and an external unit (e.g., a signal amplifier) of a user location. Connections between the external unit and devices within the user location or premises may comprise optical, wireless and/or coaxial lines or links. One type of network may, for example, be configured such that the service provider transmits data over coaxial wiring to an amplifier or node and subsequently over fiber optic lines from the amplifier or node to individual user locations (e.g., if the node or amplifier is configured to service multiple user locations). Portions of a network may further comprise satellite connections or wireless connections (e.g., WiMAX, cellular, 802.11). For example, a content provider may receive content and other data through satellite communications and deliver it to users through the same, different or a combination of communication mediums. Alternatively or additionally, client devices 111 may have direct connections to other networks such as wide area network 107. Accordingly, client devices 111 may access website server 113a through a direct connection to wide area network 107 rather than through private media distribution network 103.

Client devices 111 may include a wide variety of devices or systems including, for example, mobile communication device 111a, personal computer 111b, thermostat or another home control device 111c, remote control 111d (e.g., for a display device such as television 111f or customer premises equipment (CPE) such as a set-top box (STB)), customer premises equipment (CPE) 111e, television 111f and the like. Communication server 109 may operate to coordinate communication between devices 111 without requiring devices 111 to directly register with one another. Instead, devices 111 may enroll or register with communication server 109. A user may then specify which devices may communicate with other devices and which other devices. Additionally or alternatively, the user may specify whether the devices 111 are receivers, senders (e.g., transceivers) or both. Some devices may be identified as both transmitters and receivers of communications. Server 109 may broker communications between devices 111 based on the specified role of each of devices 111 and other user preferences and specifications. In one example, server 109 may facilitate control of television 111f and/or CPE 111e based on signals and commands received from remote control 111d by relaying the signals and commands to the appropriate destination devices. Communication server 109 may further be configured to coordinate communications between applications. Additionally, devices 111 may communicate with one another or with an application without having knowledge of the other devices' or applications' hardware or network identifier (e.g., a MAC address or TCP/IP address).

Communication server 109 may further be connected to one or more service provider servers 110 through private media distribution network 103 and/or public wide area network 107, or other networks types. A service provider may thus listen to data received from or transmit data to client devices 111 by enrolling as a receiver and/or transmitted with communication server 109. In one example, server 109 may coordinate content delivery requests based upon input received from mobile communication device 111*a*, PC 111*b* and/or remote 111*d* (e.g., without involvement of CPE 111*e*) by forwarding the commands from devices 111*a*, 111*b* and/or 111*d* directly to servers 110. Other options, commands, functions and input may be communicated between client devices 111 and servers 110 through server 109 in similar fashion.

Figure 2:
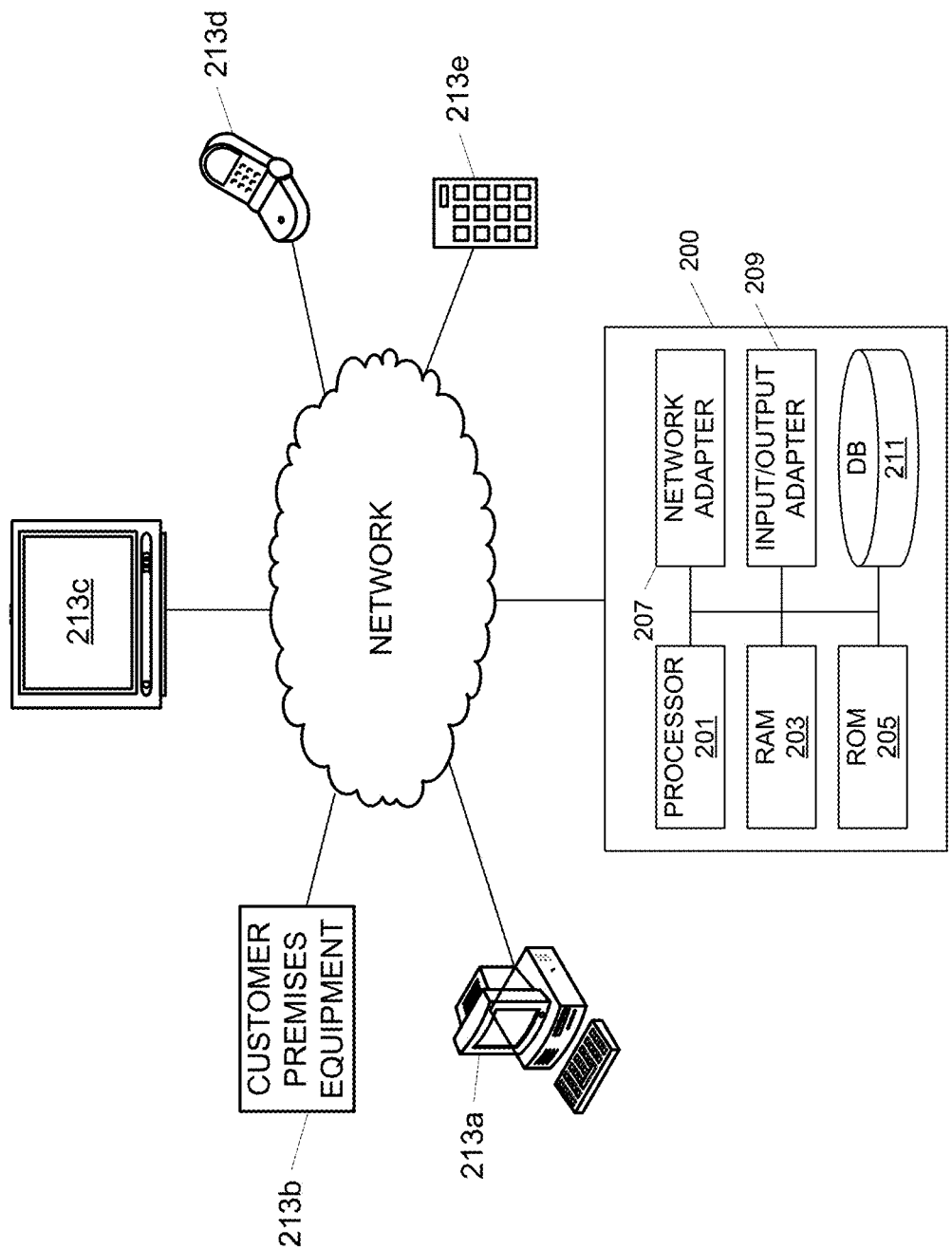
FIG. 2 illustrates a communication device configured to facilitate communication between networked devices according to one or more aspects described herein.

FIG. 2 illustrates a computing system 200 that may be used in the network environment 100 of FIG. 1. In one example, computing system 200 may operate as a communication server (e.g., server 109 of FIG. 1). Computing system 200 may include a processor 201, random access memory (RAM) 203, read only memory (ROM) 205, network adapter 207, input/output adapter 209 and database 211. Processor 201 may operate to perform mathematical calculations and other processes to assist in the execution of computer executable instructions. RAM 203 and ROM 205 may be configured to temporarily or permanently store the computer executable instructions for retrieval and execution. Network adapter 207 may be configured to facilitate communication over various types of networks (e.g., wide-area networks, local area networks, public networks, private networks, in-home networks, etc.) with one or more other devices such as devices 213 and/or applications (not shown).

Devices 213 may enroll or register with computing system 200 to communicate with one another without having to directly register with each other. In one or more arrangements, applications executing on devices 213 may also register through computing system 200. For example, each registered device or application may be assigned a communication thread (e.g., a socket, or one of multiple threads or sessions in a socket) and an identification code. Accordingly, a number of sockets may equal the number of identifiers (e.g., identifier codes) currently active or being used. An identifier may be unique among devices and applications currently registered within computing system 200 so long as the corresponding device is connected to computing system 200 or the corresponding application is still running. In some instances, once a device disconnects from computing system 200, the device may automatically be unregistered. Similarly, an application that is closed or otherwise stops executing may automatically be unregistered from system 200. Computing system 200 may poll devices 213 and applications running thereon to insure that its registration data is current. In one or more arrangements, the identifier may be generated and assigned by computing system 200. Additionally or alternatively, the identification code might not be globally or universally unique to the hardware device (e.g., a MAC address intended to be unique among all network devices). Thus, while computing system 200 may, in one or more embodiments, expose the identification code of the various devices and applications which system 200 is serving, computing system 200 might not expose a corresponding MAC address or TCP/IP address that is universally unique to the devices.

System 200 may store information that indicates whether each of devices 213 or applications is a receiver, a sender or both. The role (e.g., receiver, sender, or both) of a device such as device 213*a* or application may be device-specific or application-specific. For example, device 213*a* may be a receiver with respect to device 213*b* but may operate as both a receiver and sender for device 213*c*. System 200 may further store various permissions for communication between devices 213. For example, system 200 may store a permission identifying the actions one device (e.g., device 213*d*) may perform with respect to another device (e.g., device 213*c*). In one particular example, system 200 may store a permission indicating that only devices 213*d* and 213*e* are allowed to transmit data to STB 213*b*. Accordingly, if device 213*a* attempts to transmit data to STB 213*b*, system 200 may filter or block the data from delivery to device 213*b* based on the defined permissions. In another example, device 213*a* may prevent device 213*c* from receiving communications from device 213*a* by defining a corresponding permission. Thus, system 200 may prevent or disallow device 213*c* from registering to receive communications from device 213*a* based on the defined permission. Users may configure device registration, permissions and other parameters using one or more of devices 213 or through a terminal (not shown) that is part of or dedicated to system 200. Similar permission parameters and rules may be defined on an application level and is not limited to definition at the device level. For example, device 213*b* may allow data to be sent to application A running on PC 213*a* but not application B also running on PC 213*a*. Permissions may further be defined based on application or device types or categories, device or application capabilities and the like.

Based on the enrollments and permissions, system 200 may identify destination devices for a particular communication and thereby facilitate dynamic and real-time communications between various registered devices. In one example, if device 213*a* is enrolled as a sender for devices 213*c* and 213*e*, data to be sent from device 213*a* (e.g., application data, content or commands) may be automatically transmitted to each of device 213*c* and 213*e* by system 200. In particular, system 200 may identify that communications from device 213*a* are to be transmitted to devices 213*c* and 213*e* based the on enrollment and permission information stored therein. Additionally or alternatively, system 200 may store hardware and software capabilities and application and/or device characteristic information such as screen size, resolution, processor speed, input capabilities (e.g., touch screen vs. physical key inputs), protocol capabilities and the like. System 200 may thus include further functionality to convert data to an acceptable format for a destination device. For example, if device 213*e* has a resolution less than a native resolution of an image to be transmitted from television 213*c*, system 200 may generate, or cause a corresponding device to generate, a low resolution version of the image for device 213*e*. In another example, if application data transmitted from PC 213*a* includes touch-screen input options, but destination device 213*e* or an application executing thereon does not include touch input options, system 200 may modify the application data to allow physical input methods as an alternative to the touch-screen input options. In a particular example, interfaces having touchscreen buttons may be modified to include a corresponding number input option. Accordingly, a user may select the touchscreen buttons using physical number key buttons instead. Other examples of system 200 reconfiguration or reformatting of data may include modifying a content format (e.g., from HTML to XML or EBIF to XML), a communication protocol (e.g., MPEG to IP) and the like.

According to another aspect, system 200 may serve as a translator for various commands and user input between devices 213. For example, if remote control 213*e* includes a last menu item option, but television 213*c* or customer premises equipment 213*b* does not have or understand such an option, system 200 may map the last menu item option to a series of controls with which customer premises equipment 213*b* or television 213*c* is compatible. Accordingly, in one example, the last menu item option may be mapped to a number of DOWN commands that are understandable to television 213*c* or customer premises equipment 213*b*. In another example, remote control 213*e* may include an UP-RIGHT direction button, which system 200 may translate or map to an UP command and a separate RIGHT command (e.g., that are to be executed in succession) for television 213*c* or other device remote control 213*e* is to control. Various other macros or mappings may be defined within system 200 thereby alleviating storage requirements of a control device such as remote control 213*e*, allowing advance functionality to be provided on a control device without being restricted by the functionality of a controlled device and improving compatibility between devices.

In another example, a user may operate remote control 213*e* to select a content item from a list of on-demand video programs. The list may be simultaneously displayed on remote control 213*e* and by customer premises equipment 213*b* on television 213*c*. For example, the list of on-demand video programs may be displayed on remote control 213*e* through a touch screen display. The touch screen may further allow a user to select a content item therefrom using touch input. Selection input received by remote control 213*e* may include X, Y coordinates corresponding to the location of the selected content item on the touch screen display of remote control 213*e*. However, customer premises equipment 213*b* and/or television 213*c* might not be compatible with coordinates (e.g., X, Y coordinates) as input or control parameters. Accordingly, system 200 may determine the positional relationship between a current position of a selection cursor or other indicator and a position of the user's selection. The system 200 may then translate this relationship into a series of cursor movements (e.g., LEFT, RIGHT, UP, DOWN). For example, system 200 may determine that customer premises equipment 213*b* displays the list of content items at a resolution of 1080×720 pixels and that the cursor moves at a rate of 50 pixels a second (or per command/selection of a direction button). The system 200 may further determine that the cursor is currently 200 pixels above and 100 pixels to the right of the user's selection point. Accordingly, the system 200 may transmit a LEFT command to move the cursor 100 pixels to the left (e.g., depression of the LEFT command for 2 seconds or inputting 2 separate LEFT commands) followed by a DOWN command to move the cursor down 200 pixels (e.g., depression of the DOWN command for 4 seconds or inputting 4 separate DOWN commands). The resulting image (with the changed position of the cursor) generated by customer premises equipment 213*b* may then be transmitted to or otherwise updated on remote control 213*e*. The updating of the cursor movement and/or image may be performed in real-time and/or synchronized with the movement and image displayed through customer premises equipment 213*b* so that there is no perceptible delay to the user. Thus, according to the above system, in situations where customer premises equipment 213*b* might not understand coordinate input, system 200 may interpret the coordinates into compatible commands.

Figure 3:
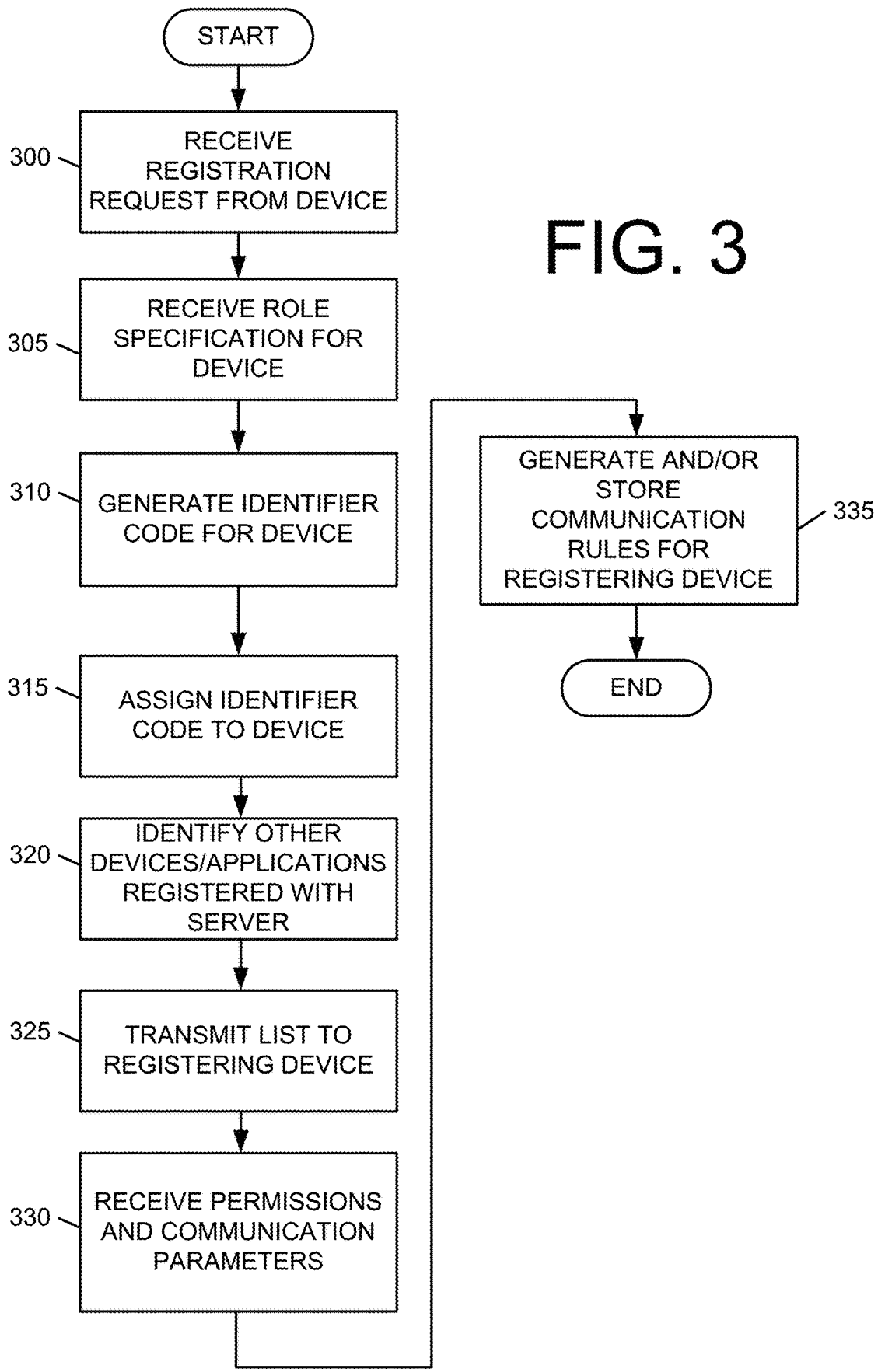
FIG. 3 illustrates a method for enrolling or registering a device in a communication network according to one or more aspects described herein.

FIG. 3 is a flowchart illustrating an example method for enrolling or registering a device or application with a communication server such as computing system 200 of FIG. 2. In step 300, the communication server (e.g., a computing device) may receive a request from a device to register with the communication network serviced by the communication server. For example, the registration request may be received through a network, a website or web page that may be accessed from the device. The request may include identification information such as a TCP/IP address and/or a MAC address and/or device capability information including, for example, hardware specifications. In one or more arrangements, the communication server may require user authentication to validate the registration request.

Upon receiving the registration request (and authenticating the user, if needed), the communication server may request and receive specifications of one or more roles for the device in step 305. Roles may include sender, receiver or both. Other roles may also be defined depending on the needs of the server, a user and/or devices within the communication network. In step 310, the communication server may generate an identifier for the device that is unique within the communication network managed by the communication server. The identifier may be generated randomly, using predefined identifiers and/or based on an algorithm or formula. The identifier may then be assigned to the device and stored in association with the device's other identifying information (e.g., MAC address or network address) in step 315. Additionally, in some arrangements, the server may transmit (e.g., broadcast) the registration and availability of the new device to other registered devices in the network with the assigned identifier.

In step 320, the server may identify other devices and/or applications registered with the server that complement or are associated with the role(s) specified for the registering device. For example, if a device is identified as a sender, the server may identify registered devices and/or applications that have the capability to receive data. Similarly, if the device is identified as a receiver, the server may identify registered devices and/or applications that are capable of transmitting data. If a device is identified as both sender and receiver, transmission- and reception-capable devices and/or applications may be identified among the currently registered devices. In some arrangements, permissions set by the registered devices and/or applications may be considered in identifying the devices. For example, if a registered device restricts receivers of its data to a specific group of devices (not including the registering device), the server might not identify the registered device as a potential sender.

In step 325, the server may send a list of the identified registered devices and/or applications to the registering device for designation of device-specific and application-specific roles, permissions and communication parameters. For example, the server may ask the registering device to designate which of the identified registered devices and/or applications may receive data from the registering device. Alternatively or additionally, the server may ask the registering device to identify those devices and/or applications from which the device would like to receive data. In step 330, the server may receive a response from the registering device setting the permissions and communication parameters corresponding to the list of identified devices and/or applications. Based on the received parameters, the server may generate and/or store communication rules in a database in step 335. For example, the rules may specify which devices and/or applications are to receive a communication from the registering device. The rules may then be applied when relevant communications are subsequently received.

The above enrollment process may also be used to enroll applications within the communication server and network. For example, an application may specify its capabilities and role and receive a list of other applications and/or devices to which data may be sent or from which data may be received. Accordingly, different applications running on a single device may specify different enrollment and communication parameters and may be assigned different identifiers. Additionally, a sender device or application may specifically target data to a particular application or set of applications using the application specific identifiers.

FIGS. 4A and 4B illustrate example registration interfaces that may be displayed on or in associated with a registering device. In FIG. 4A, interface 400 includes a user login section 401 for user or account authentication and a device and application identification section 403. User login section 401 may include fields 405 for user entry of authorization information including, for example, a username and a password. In other examples, the authorization information may include an authorization code or other security code or phrase. Device and application identification section 403, on the other hand, provides the user with options to specify the type of device or application that is to be registered. For example, section 403 includes drop-down menu 407 for selection of whether a device or an application is being registered. Additionally, section 403 includes a browser option 409 for identifying the specific application or device that is being registered. Browser option 409 may, in some examples, cause a list of known applications and devices to be displayed to the user for user selection. If a device or application is not in the list, the user may manually search for the device or application (e.g., a driver or application certificate) or manually define the attributes or characteristics of the device or application including capabilities, functionality, type of application or device and the like. Further, interface 400 includes a role selector 413 for choosing the device's overall role in the network. An overall role may include a definition of the device's capabilities. For example, the overall role may indicate whether the device is capable of receiving data and transmitting data. A device or application may also be designated with roles that are specific to another application or device (e.g., defining what is permitted to be performed with respect to the other application or device). The device or application specific roles may be defined in another interface such as interface 450 of FIG. 4B as further described below.

Upon entering the requisite information, the user may then select register option 411 to continue the registration process. Interface 400 also provides clear option 415 and cancel option 417 to either remove the current entries in all fields or to cancel registration, respectively.

FIG. 4B illustrates an example interface 450 that is displayed upon successful authentication after, for example, using interface 400 of FIG. 4A. Interface 450 includes an identification code 451 assigned by the communication server to the registering device as well as a list 453 of senders or receivers or both depending on the role selection for the registering device in interface 400 of FIG. 4A. For example, if the registering device is designated as only a receiver, other registered devices or applications that only have receiving capabilities might not be included in list 453. Each of the devices and applications in list 453 may include a role identifier 455 and action selectors 457. Action selectors 457 include options for actions to be taken with the corresponding device or application. For example, action selectors 457 may include a receive option, a send option and a send/receive option. Accordingly, selecting a receive option may indicate to the server that the registering device wishes to receive data from the corresponding registered device. In another example, if a send option is selected, the server may recognize that the registering device wishes to send data to the corresponding registered device.

Block selectors 459 are included in interface 450 to allow the user to block sending data to and/or receiving data from devices for which no action options have been selected. Additionally or alternatively, block selectors 459 may disallow any actions not specifically selected. For example, if a user selects a receive option from one of action selectors 457 for a corresponding other device, but not a send option, the corresponding other device may be allowed to send data to the registering device but might not be permitted to receive data therefrom. This restriction may be enforced regardless of the action configuration of the other device (e.g., even if the receive option for the registering device is selected in the other device's enrollment configuration). In one or more arrangements, action selectors 457 and block selectors 459 might only include actions available based on the corresponding device or application's capabilities and/or designated overall role. For example, if Device B has sending capabilities but not receiving capabilities, the action options listed in selectors 457 might only include receive and none. Interface 450 illustrates a device enrollment configuration rather than an application registration. However, a communication configuration interface for an application may include similar functionality, features and options as those shown in interface 450.

FIG. 5 is a flowchart illustrating an example method for coordinating and delivering communications between devices in a communication network. The coordination and delivery may be performed by a communication server such as system 200 of FIG. 2. In step 500, the communication server (e.g., a computing device) may receive a transmission from a sending device or application intended for a recipient device or application in the network. The recipient device or application may be specified in the transmission, e.g., by the identifier code or codes corresponding to the intended recipients. Alternatively, the transmission might not include any identifier codes or other recipient identifiers. In step 505, the communication server may determine the intended recipients. Determining the intended recipients may include extracting specified recipient identifier codes from the transmission (if included) and/or searching an enrollment database to determine which devices and/or applications are enrolled as receivers of data transmitted from the sending device or application. In one or more arrangements, if the transmission includes a specification of recipient identifiers, the communication server might only transmit the data to the specified recipients regardless of whether other devices or applications are enrolled as recipients. Whether to include the other devices or applications might also be specified by an indicator or flag that is stored in the transmission (e.g., a variable in a header or payload section) or in an enrollment or configuration database. If no identifier codes or recipients are specified in the transmission, the field of recipients may include all recipients that are enrolled as receivers for data transmissions from the sending device.

Once the recipient device(s) and/or application(s) have been identified, the communication server may subsequently process the transmitted data for each device. For example, in step 510, the communication server may determine one or more rules and/or compatibility parameters associated with a first recipient device or application. Rules may be relevant to compatibility and non-compatibility issues. For example, a rule may be defined for when transmissions (e.g., time of day, time of year, weekends vs. weekdays, etc.) are to be sent to the recipient device or application. Another example rule may control what types of data are allowed to be sent to the recipient device or application (e.g., only video, only audio, only text, only text and audio, content rating restrictions, size of the data, etc.). Compatibility parameters may include capability information including resolution limitations, screen size limitations, input method availabilities, audio and video rendering capabilities, protocol compatibilities and the like. Additionally or alternatively, compatibility parameters may indicate whether a recipient device understands certain types or forms of input or commands. As noted herein, for example, some televisions, television control systems or other customer premises equipment (e.g., set-top boxes, DVD players, analog/digital video storage systems) might only understand a limited number of command inputs such as up, down, right, left, select, on/off and the like. Accordingly, if the transmitted data includes commands outside of this limited input set, the transmitted commands may need to be converted or modified for compatibility with the recipient device.

In step 515, the communication server may modify or convert the data in accordance with the specified rules and compatibility parameters if necessary. For example, a content item including both video and audio may be modified to include only the audio if the recipient device does not have video rendering capabilities (e.g., decoders, graphics engine, display). In another example, an image or video may be down-converted in resolution if a recipient device or application's screen size or resolution is less than the size or resolution of the original image or video. Alternatively or additionally, resolution conversion may occur based on lack of processing power/speed, available storage capacity and the like. Command conversion may include identifying a macro or other specification that indicates how a command or set of commands from a transmitting device is to be converted into commands compatible with a receiving device. For example, a SELECT & PURCHASE shortcut key on a remote control device may translate to a series of commands compatible for a television or video-on-demand system for which the command is intended. The series of commands may include, for instance, SELECT (to select the movie or other content item), followed by RIGHT (to navigate to a purchase option), followed by SELECT again (to approve the purchase). Accordingly, the communication server may store such translations or macros to further improve compatibility between devices (e.g., older devices and newer devices).

In step 520, once the data has been appropriately converted (if necessary), the data may be transmitted to the recipient device. As part of the transmission, the communication server may include the sending device or application's identifier code to specify the source of the transmission. Optionally, in step 525, the communication server may transmit a successful transmission acknowledgment back to the sending device. In some instances, if the data was not transmitted to a particular application or device, an unsuccessful transmission notification may be provided to the sending device. A transmission may fail due to multiple reasons including lack of proper conversion capabilities at the communication server, incompatibility of the data with the recipient device, restrictions implemented by the recipient device and the like. The notification may include identification of the devices or applications to which the data was not sent or unsuccessfully sent.

In step 530, the communication server may determine if the data has not been sent to any other devices or applications. If so, the communication server may begin processing the data for the next device or application by returning to step 510. In one or more arrangements, devices on which a recipient application is executing may have compatibility parameters and rules different from the recipient application. In such arrangements, the communication server might not only apply the rules and parameters of the application, but also the rules and parameters defined for the underlying recipient device. This may ensure full compatibility with both device and application since the application might not be aware of the limitations or capabilities of the device on which it is operating.

Figure 6A:
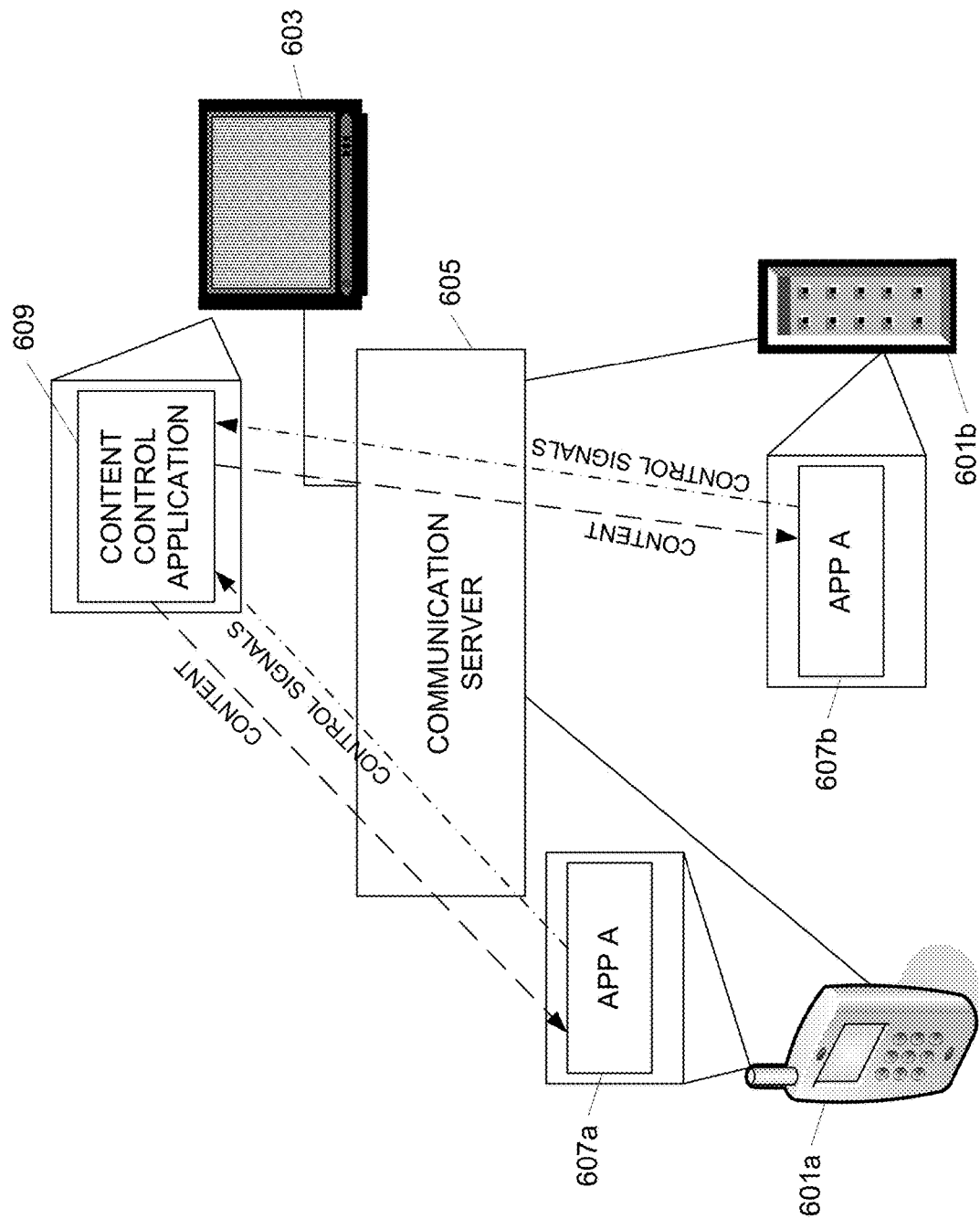
FIGS. 6A and 6B illustrate an example data environment and data flows for coordinating communications between multiple devices and applications according to one or more aspects described herein.
Figure 6B:
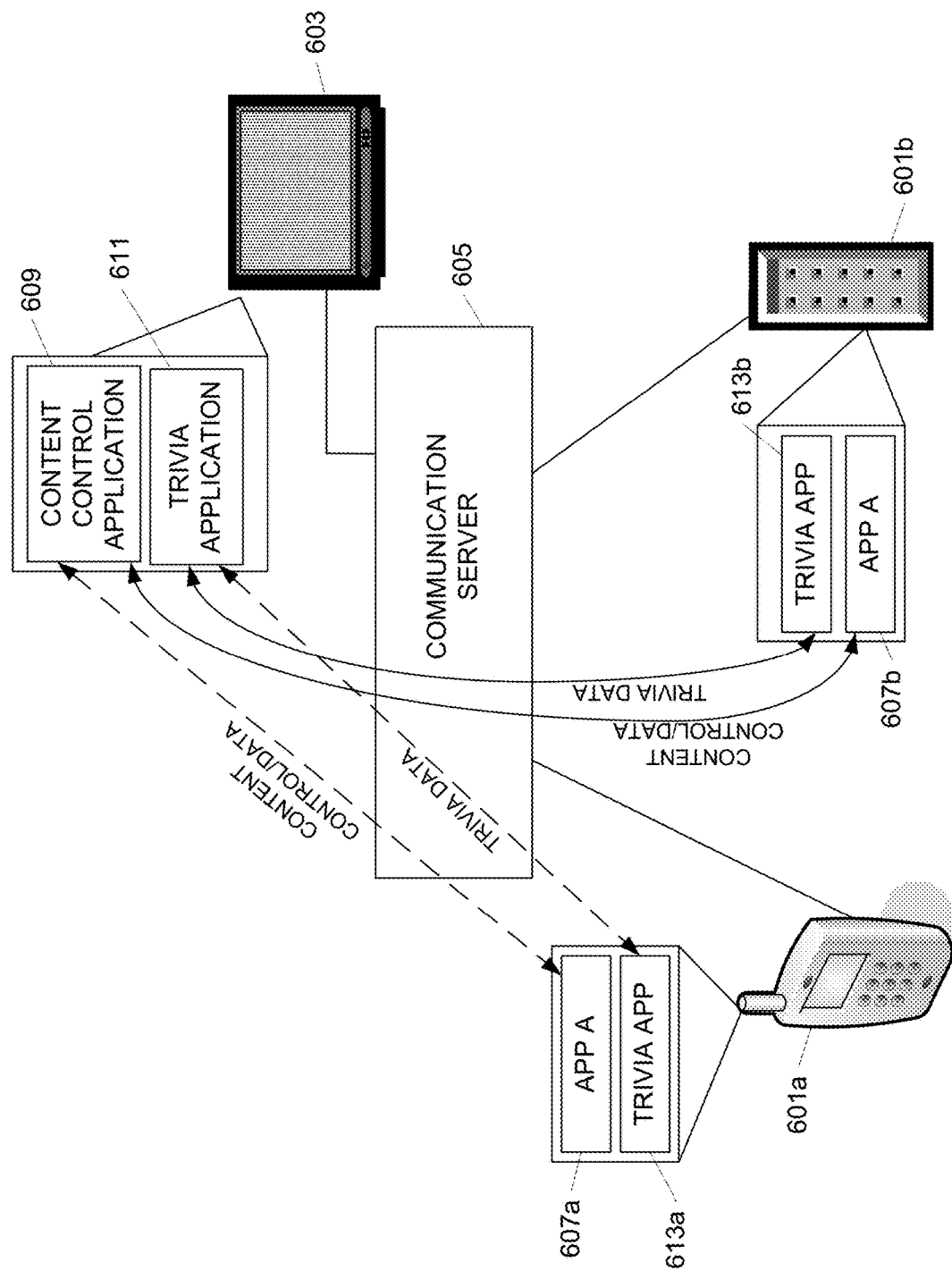

FIGS. 6A and 6B illustrate an example interactive environment in which applications running on multiple devices may dynamically communicate with one another through a communication server in real-time. For example, a trivia game may be implemented through multiple user and management applications that dynamically communicate with one another through a communication server as described in further detail below. In the illustrated example of FIG. 6A, environment 600 may include user devices 601*a* and 601*b*, each executing a plurality of applications 607 and 613 thereon, and a content rendering and distribution device (e.g., a television or another display device) 603 in association with which a content control application 609 may operate. In the example illustrated in FIG. 6A, user devices 601*a* and 601*b* may receive content such as data, advertisements, programming information, movies, television shows, video-on-demand content and the like from application 609 of content rendering and distribution device 603 through applications 607*a* and 607*b*. The communication of content and other information to and from devices 601 is generally coordinated by communication server 605. Content control application 609 may transmit (e.g., broadcast) the content intended for or from device 603 to devices 601*a* and 601*b* by specifying each application's identifier code, not specifying any recipients and allowing communication server 605 to automatically identify recipients based on enrollment information (e.g., which devices or applications have enrolled as a receiver of data from television 603) or a combination of both. In one or more arrangements, applications 607 might also be configured to transmit control signals for changing channels, controlling playback of content, ordering programming, recording programs or the like through content control application 609. Accordingly, content control application 609 may be enrolled as a receiver for data sent from either of applications 607*a* and 607*b* or both. Alternatively or additionally, content control may be exercised using a separate user device application (not shown) having a different identifier code. Data may be transmitted in a bi-directional manner such that content control application 607 receives real-time and dynamic feedback from content control application 609. For example, a current playback position in a content item may be returned in response to a fast forward or reverse command.

In FIG. 6B, device 603 and content control application 609 may determine, during a content transmission, to initiate an interactive application such as a trivia game (e.g., trivia application 611). For example, the trivia game may be associated with content in a broadcast such as football trivia during the Super Bowl. In response, trivia application 611 may transmit an invitation to join the game to each of devices 601 through applications 607. To transmit the invitation, trivia application 611 may initially be enrolled with communication server 605 as a sender of data for applications 607*a* and 607*b* and/or user devices 601*a* and 601*b*. If the users wish to join the game, the users may launch a corresponding trivia application, e.g., trivia applications 613*a* and 613*b*, and register the application as a sender and a receiver for trivia application 611. The users may then respond to the invitation request using trivia applications 613. In some arrangements, if applications 607 provide trivia game functionality, a separate trivia application such as application 613a or 613b might not be required. The response to the invitation request may include trivia game registration information including a name, age, preferred avatar (for representing the user in the game), skill level, preferred trivia topics and the like. The game registration data may be stored by television 603 and trivia application 611 thereof. In some arrangements, the game registration data may also be stored in communication server 605 in association with the identifier codes of user trivia applications 613a and 613b.

Once registered, users may begin receiving questions from trivia application 611 at devices 603 through user trivia applications 613. The users may receive the same questions (e.g., as a general broadcast from trivia application 611) or different questions. For example, trivia application 611 may provide different questions or content to be sent to each of applications 613a and 613b by directing a first transmission to application 613a and directing a different second transmission to application 613b using their respective identifier codes. Alternatively or additionally, the transmissions to and from application 611 may use application-specific data such as game registration data as identification information. If using game registration data instead of an identifier code to identify the destination or source of a communication, communication server 609 may determine the associated identifier code and/or network address based on the registration data (if stored). In addition to different questions, trivia application 611 may further individually indicate whether the users were correct or incorrect by specifically targeting a user's application and device. Various other information and content may be individually directed to applications and devices as described in the above example environment 600.

In the illustrated environment 600 of FIGS. 6A and 6B, communication server 605 may be further configured to format data and content according to the different characteristics and capabilities of devices 601 and 603 and applications 607, 609, 611 and 613. Additionally, transmissions may be targeted (e.g., directed to an identifier code) to a specific device such as device 601a or 601b instead of individual applications. In such arrangements, the device 601a or 601b may be responsible for determining a relevant application to which the communication is directed. For example, communications to a device may correspond to transmitting the communication to an underlying operating system of the device. Moreover, depending on the enrollment configuration within communication server 605, communications from applications 607, 609, 611 and 613 might not always be sent to every other application. For example, data from trivia applications 613 might not be sent to content control application 609 if trivia applications 613 have not been registered as senders with respect to content control application 609. Similarly, data from content control application 609 might not be sent to trivia applications 613 and data from trivia application 611 might not be sent to applications 607 depending on the roles defines between each pair of applications.

Figure 7:
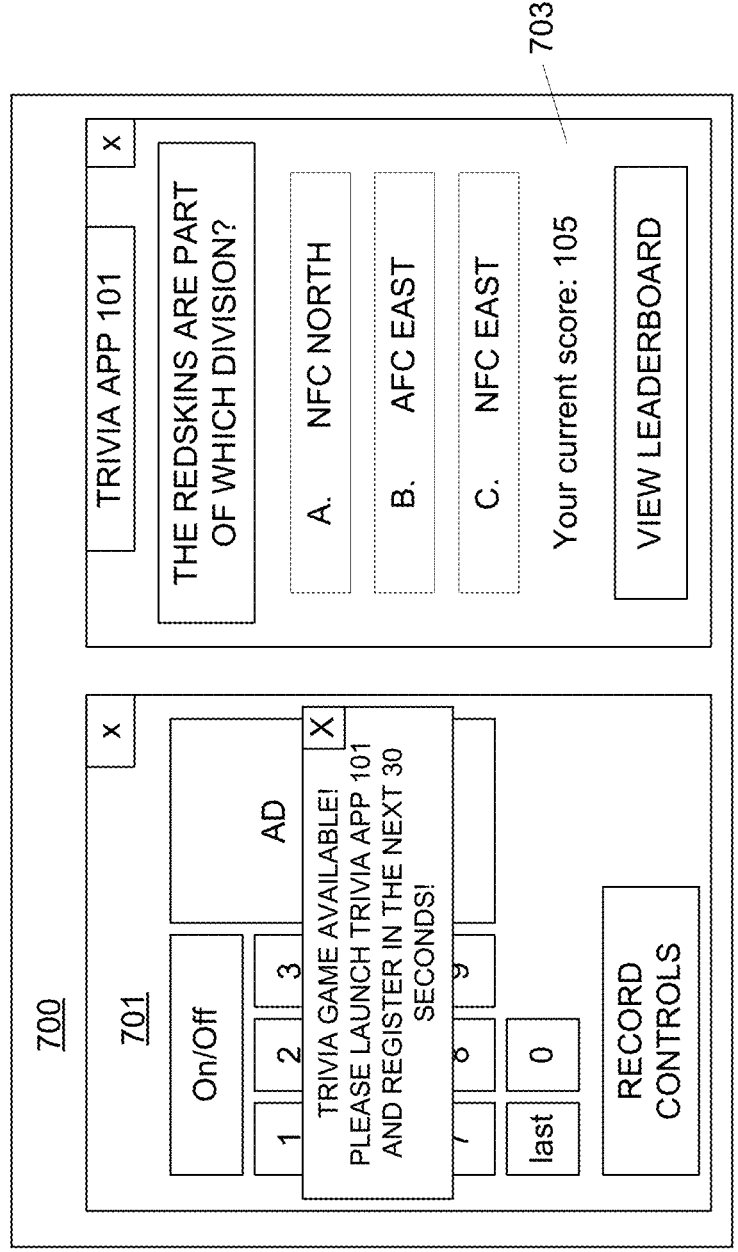
FIG. 7 illustrates an example interface including interfaces of multiple applications according to one or more aspects described herein.

FIG. 7 illustrates an example user interface that may be displayed on a user device executing applications for controlling content tuning and participating in a trivia game. Interface 700 includes a split screen interface in which a content control application interface 701 is displayed on the left and a trivia game application interface 703 is displayed on the right. Application interface 701 may be used when a user wishes to modify a content control parameter of a content control application on a display device (e.g., television 603 of FIG. 6) while interface 703 may be used to respond to questions and otherwise participate in a trivia game managed by a trivia manager application executing on a remote device (e.g., a set-top box, television 603 of FIG. 6, PC). In interface 701, an announcement is displayed, inviting the user to participate in the trivia game. The message states "Trivia game available! Please launch Trivia App 101 and register in the next 30 seconds!" Alternatively or additionally, interface 701 may include response options (not shown) to indicate if the user would like to participate in the game. If so, the trivia manager application may provide the user with a predefined period of time (e.g., 1 minute, 2 minutes, 30 seconds, 15 seconds) to launch the trivia application and register. Response options may be provided through the content control application to the trivia manager application since the trivia application might not have been launched yet.

FIG. 8 illustrates an enrollment configuration table that defines device and application communication registrations. Table 800 includes a list of entities 801 and their roles 803 with respect to a list of other entities 805. As illustrated, applications and devices may be assigned roles with respect to other devices and/or applications. For example, Application A is designated as a sender and a receiver of data for Application B. Application B, on the other hand, is designated as a sender of information to all devices and applications registered in the system. A role may also be applied to a subset of all devices or application. For example, Application C is designated as a sender to Device A and Application B and as a receiver for Application D and Device C.

Accordingly, a communication server such as system 200 of FIG. 2 may coordinate communication by looking up roles in an enrollment table such as table 800. The information in table 800 may be cross referenced with one or more other tables specifying identifier codes and/or network or physical addresses.

One or more of the applications, services, content items and the like might only be available on a subscription basis or upon payment. Accordingly, a user may be required to register with a service provider and select the content, applications and/or services the user wishes to receive.

Additionally, the devices connected to a communication server such as server 605 of FIG. 6 may correspond to devices within a local (e.g., public or private) area network or a large network. For example, the devices may include in-home devices connected to a home network. Other locations may also include such networks and servers that facilitate communication between devices in such networks.

The methods and features recited herein may further be implemented through any number of computer readable media (e.g., memory) that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more of the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of the IC. Further, the IC may output image data to a display buffer.

Although specific examples of carrying out the invention have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

The invention claimed is:

1. A method comprising:
   sending, by a first computing device to a second computing device, a request to register, with the second computing device, the first computing device;
   receiving, by the first computing device from the second computing device, a first identification code assigned to the first computing device;
   receiving, by the first computing device from the second computing device:
   a plurality of control commands compatible with the first computing device, wherein the plurality of control commands correspond to user input data associated with the first identification code, wherein the user input data is incompatible with the first computing device;
   a second identification code for a third computing device; and
   a role of the first computing device with respect to the third computing device; and
   based on the role of the first computing device, the second identification code, and the plurality of control commands, sending a communication by the first computing device to the third computing device.

2. The method of claim 1, wherein the role comprises one or more of: a sender or a receiver.

3. The method of claim 1, further comprising:
   receiving, by the first computing device from the second computing device and based on the request, a list of computing devices registered with the second computing device, wherein the list of computing devices comprises the third computing device; and
   sending, by the first computing device to the second computing device, an indication that the role of the first computing device comprises sending data to the third computing device.

4. The method of claim 1, further comprising:
   receiving, by the first computing device from the second computing device and based on the request, a list of computing devices registered with the second computing device, wherein the list of computing devices comprises the third computing device, wherein the role of the first computing device comprises a sender of data.

5. The method of claim 1, wherein the role is based on capabilities of the first computing device.

6. The method of claim 1, wherein the first identification code is unique to the first computing device and the second identification code is unique to the third computing device.

7. The method of claim 1, wherein the first identification code is different from a network address of the first computing device.

8. The method of claim 1, wherein the request comprises a network address of the first computing device.

9. The method of claim 1, wherein the plurality of control commands comprises a command to control playback of a video content item output via the third computing device.

10. The method of claim 1, wherein the first computing device comprises a remote control, and wherein the third computing device comprises customer premises equipment configured to output video signals to a display.

11. A first computing device comprising:
    one or more processors; and
    memory storing instructions that, when executed by the one or more processors, cause the first computing device to:
    send, to a second computing device, a request to register, with the second computing device, the first computing device;
    receive, from the second computing device, a first identification code assigned to the first computing device;
    receive from the second computing device:
    a plurality of control commands compatible with the first computing device, wherein the plurality of control commands correspond to user input data associated with the first identification code, wherein the user input data is incompatible with the first computing device;
    a second identification code for a third computing device; and
    a role of the first computing device with respect to the third computing device; and
    based on the role of the first computing device, the second identification code, and the plurality of control commands, send a communication to the third computing device.

12. The first computing device of claim 11, wherein the role comprises one or more of: a sender or a receiver.

13. The first computing device of claim 11, wherein the instructions that, when executed by the one or more processors, further cause the first computing device to:
    receive, from the second computing device and based on the request, a list of computing devices registered with the second computing device, wherein the list of computing devices comprises the third computing device; and
    send, to the second computing device, an indication that the role of the first computing device comprises sending data to the third computing device.

14. The first computing device of claim 11, wherein the instructions that, when executed by the one or more processors, further cause the first computing device to:
    receive, from the second computing device and based on the request, a list of computing devices registered with the second computing device, wherein the list of computing devices comprises the third computing device, wherein the role of the first computing device comprises a sender of data.

15. The first computing device of claim 11, wherein the role is based on capabilities of the first computing device.

16. The first computing device of claim 11, wherein the first identification code is unique to the first computing device and the second identification code is unique to the third computing device.

17. The first computing device of claim 11, wherein the first identification code is different from a network address of the first computing device.

18. The first computing device of claim 11, wherein the request comprises a network address of the first computing device.

19. The first computing device of claim 11, wherein the plurality of control commands comprises a command to control playback of a video content item output via the third computing device.

20. The first computing device of claim 11, wherein the first computing device comprises a remote control, and wherein the third computing device comprises customer premises equipment configured to output video signals to a display.

21. A non-transitory computer-readable medium storing instructions that, when executed, cause:
sending, by a first computing device to a second computing device, a request to register, with the second computing device, the first computing device;
receiving, by the first computing device from the second computing device, a first identification code assigned to the first computing device;
receiving, by the first computing device from the second computing device:
a plurality of control commands compatible with the first computing device, wherein the plurality of control commands correspond to user input data associated with the first identification code, wherein the user input data is incompatible with the first computing device;
a second identification code for a third computing device; and
a role of the first computing device with respect to the third computing device; and
based on the role of the first computing device, the second identification code, and the plurality of control commands, sending a communication by the first computing device to the third computing device.

22. The non-transitory computer-readable medium of claim 21, wherein the role comprises one or more of: a sender or a receiver.

23. The non-transitory computer-readable medium of claim 21, wherein the instructions, when executed, further cause:
receiving, by the first computing device from the second computing device and based on the request, a list of computing devices registered with the second computing device, wherein the list of computing devices comprises the third computing device; and
sending, by the first computing device to the second computing device, an indication that the role of the first computing device comprises sending data to the third computing device.

24. The non-transitory computer-readable medium of claim 21, wherein the instructions, when executed, further cause:
receiving, by the first computing device from the second computing device and based on the request, a list of computing devices registered with the second computing device, wherein the list of computing devices comprises the third computing device,
wherein the role of the first computing device comprises a sender of data.

25. The non-transitory computer-readable medium of claim 21, wherein the role is based on capabilities of the first computing device.

26. The non-transitory computer-readable medium of claim 21, wherein the first identification code is unique to the first computing device and the second identification code is unique to the third computing device.

27. The non-transitory computer-readable medium of claim 21, wherein the first identification code is different from a network address of the first computing device.

28. The non-transitory computer-readable medium of claim 21, wherein the request comprises a network address of the first computing device.

29. The non-transitory computer-readable medium of claim 21, wherein the plurality of control commands comprises a command to control playback of a video content item output via the third computing device.

30. The non-transitory computer-readable medium of claim 21, wherein the first computing device comprises a remote control, and wherein the third computing device comprises customer premises equipment configured to output video signals to a display.

* * * * *

UNITED STATES PATENT AND TRADEMARK OFFICE
CERTIFICATE OF CORRECTION

PATENT NO. : 12,101,201 B2  
APPLICATION NO. : 18/472539  
DATED : September 24, 2024  
INVENTOR(S) : Dixon et al.

Page 1 of 1

It is certified that error appears in the above-identified patent and that said Letters Patent is hereby corrected as shown below:

In the Specification

In the Detailed Description

Column 13, Line 26:
Delete "609" and insert --605--

Signed and Sealed this  
Sixth Day of May, 2025

Coke Morgan Stewart  
*Acting Director of the United States Patent and Trademark Office*